United States Patent [19]
Kossat

[11] Patent Number: 5,333,217
[45] Date of Patent: Jul. 26, 1994

[54] METHOD AND APPARATUS FOR INTRODUCING A FLEXURAL COUPLER INTO ITS COUPLING POSITION

[75] Inventor: Rainer Kossat, Hainbach, Fed. Rep. of Germany

[73] Assignee: Siemens Aktiengesellschaft, Munich, Fed. Rep. of Germany

[21] Appl. No.: 80,208

[22] Filed: Jun. 23, 1993

[30] Foreign Application Priority Data
Jul. 1, 1992 [DE] Fed. Rep. of Germany ....... 4221566

[51] Int. Cl.$^5$ ............................................ G02B 6/26
[52] U.S. Cl. .................................. 385/32; 385/13; 385/39
[58] Field of Search ............... 385/32, 31, 13, 25, 385/27, 30, 39; 250/227.24; 356/73.1

[56] References Cited

U.S. PATENT DOCUMENTS

| | | | |
|---|---|---|---|
| 4,729,630 | 3/1988 | Martinez | 385/13 |
| 5,009,479 | 4/1991 | Morrison | 250/227.24 X |
| 5,040,866 | 8/1991 | Engel | 385/32 |
| 5,179,275 | 1/1993 | Lieber et al. | 250/227.24 |
| 5,189,300 | 2/1993 | Lieber et al. | 250/227.24 |

FOREIGN PATENT DOCUMENTS

| | | | |
|---|---|---|---|
| 0485848 | 5/1992 | European Pat. Off. | 385/22 |
| 2236405 | 4/1991 | United Kingdom | |

OTHER PUBLICATIONS

Abstract of Japanese Published Application 2 096 626 (Apr. 9, 1990), *Patent Abstracts of Japan*, vol. 14, No. 303 (P-1070), Jun. 29, 1990.

Abstract of Japanese Published Application 01-203 938 (Aug. 16, 1989), *Patent Abstracts of Japan*, vol. 13, No. 505 (P939), Nov. 14, 1989.

*Primary Examiner*—Rodney B. Bovernick
*Assistant Examiner*—Phan Thi Heartney

[57] ABSTRACT

An apparatus for utilizing a movable arbor of a flexural coupler for bringing a light waveguide into a curved path for infeed and outfeed of light. The motion of the arbor is ended in a selected working position and is retained in that position. The motion of the arbor can be in response to measured conditions.

24 Claims, 2 Drawing Sheets

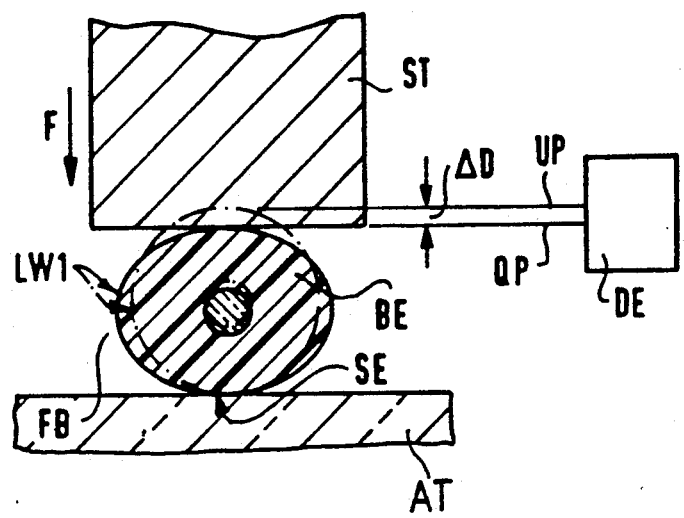
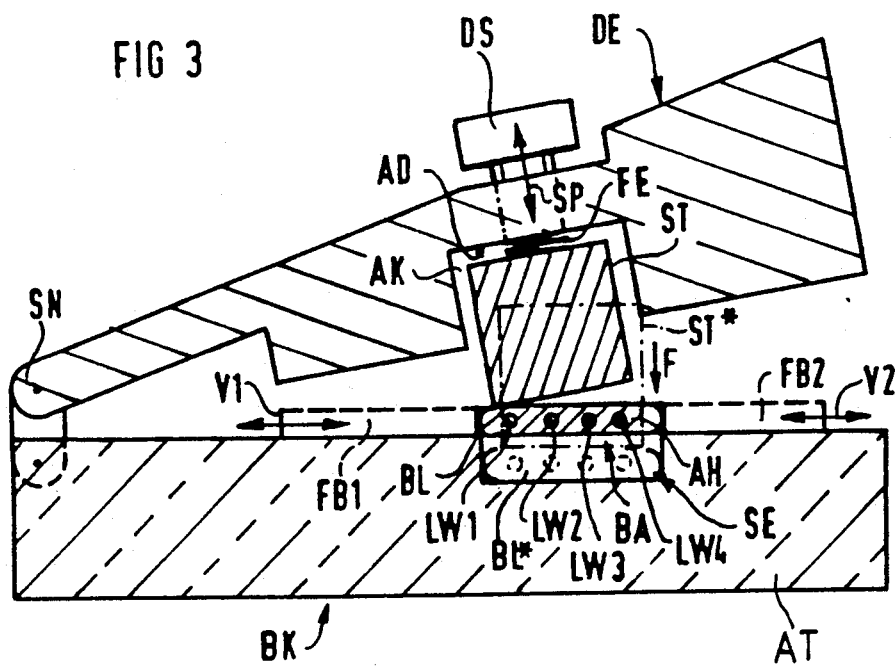

METHOD AND APPARATUS FOR INTRODUCING A FLEXURAL COUPLER INTO ITS COUPLING POSITION

BACKGROUND OF THE INVENTION

The present invention is directed to a method for introducing a flexural couple into a coupling position, whereby at least one light waveguide is brought by a movable arbor into a curved path along which light can be coupled in and out and to the apparatus for forming the coupler.

U.S. Pat. No. 5,040,866, whose disclosure is incorporated herein by reference thereto and which claims priority from German Application 34 29 947, discloses a device which has a pin that will press a light waveguide against a lower part of a coupling mechanism. For introducing the light waveguide into the coupling mechanism, the pin is moved up against a spring power, so that the light waveguide can be introduced from above in a simple way. After the introduction of the light waveguide, the pin is moved down and the light waveguide is thereby pressed against the lower part so that it is guided in a curved path in a channel extending around a circumference of the pin. The pin is resiliently seated so that it will guarantee that the light waveguide will be tightly pressed against the lower part. There is a risk in this known coupling mechanism that, even after the conclusion of the closing because of the continuous influence of the spring power with which the pin is pressed against the lower part, a further deformation will occur. This can lead to a laterally changing deformation, for example flowing, of the coating of the light waveguide. The diameter tolerances of the light waveguide entered into the extent of the flow process, namely even when a detent is provided. As a result, the spatial position of the light proceeding in the curved path of the light waveguide in the coupling region to a transmitter or, respectively, to a receiver can continue to chronologically vary, for example during a measuring event as well. This disadvantageously results in a chronological variation of the infeed or, respectively, outfeed efficiency.

U.S. Pat. No. 5,179,275, whose disclosure is incorporated herein by reference thereto and which claims priority from the same German Application as European Published Application 0 485 848 and U.S. Pat. No. 5,189,300, whose disclosure is also incorporated herein by reference thereto, both disclose a method for coupling light in and out of a light waveguide for measurement purposes. In detail, one may proceed so that the pressure is exerted on the light waveguide with a flexural coupler. The strength of the outfed light is then measured during the deformation of the coating occurring during the pressure before the ultimate condition of the pressure-dependent deformation is reached. The final measured value obtainable in the ultimate condition is finally determined by extrapolation from the measured values acquired during the deformation.

SUMMARY OF THE INVENTION

The object of the present invention is to provide a way when utilizing a flexural coupler for a light infeed/light outfeed with respect to at least one light waveguide to be more reliably implemented in a simple manner. This object is inventively achieved by a method wherein the motion of the arbor ends in a selectable working position and in that the arbor is retained in this working position.

The invention is particularly distinguished in that the motion of the arbor with which at least one light waveguide is brought into a curved path can be fixed in any desired position, for example in the selected working position. After the introduction of the flexural coupler into the working position, a further, chronologically changing deformation of the light waveguide and, thus, a chronological variation of its coupling factor or, respectively, coupling efficiency in an infeed or outfeed of light can be largely limited or, respectively, avoided. A further deformation or respective flowing of the coating of the light waveguide is largely restricted due to this selected arrest of the movable arbor, wherein the path limitations of the arbor are determined. A further advantage of the invention is that the diameter fluctuations of the light waveguide or of a light waveguide ribbon enter into the extent of the flow process to a far less extent or not at all. Since the motion of the arbor can be interrupted at an arbitrarily prescribable working position, diameter tolerances of the light waveguide or varying ribbon thicknesses no longer play a disturbing part for a secured function of the flexural coupler, for example for following measurements. Due to the arrest of the arbor in its working position, namely, a continuous influence of the force of the arbor on the light waveguide in a defined way is avoided. Largely constant infeed or outfeed conditions can, thus, be obtained in a simple way for the actual measurement process.

According to a first expedient development of the invention, the movable arbor is fixed in the working position transversely relative to its effective or, respectively, motion axis. Its arrest can occur expediently implemented with the assistance of a clamp pin that engages the arbor transversely relative to its motion axis and retains the arbor in the guide thereof.

According to a second expedient development of the invention, the motion of the arbor can be aborted or stopped in the working position with the assistance of a specific control criterion. A specific chronological duration can be advantageously utilized for this purpose. It can be expedient to stop the arbor, for example, after a chronological duration of 1 through 60 seconds following the closing of the flexural coupler.

The specific control criterion can also be advantageously obtained from the chronological change of the light level or, respectively, the light intensity as soon as the flexural coupler is closed and the arbor thereof presses against or, respectively, acts on the light waveguide. Since the chronological variation of the coupling factor proportionally follows the chronological course of the power level, the control criterion for stopping the arbor motion can be expediently derived therefrom. The farther-reaching, for example continued deformation of the coating of the light waveguide, can be largely suppressed in this way. For example, the relative drop in the light level or, respectively, the light intensity can be utilized as an abort or stop criterion as a measure for a deformation that has already occurred and is adequate for the required pressing power.

It can also be expedient to calculate the specific control criterion from the deformation path of the light waveguide which is traversed under the influence of the pressing power of the arbor from its undeformed, original condition. To this end, a measuring device can be attached in the bend minimum of the curved path of the light waveguide. The extent of deformation, for example, can be measured with the inductive measurement sensor, a capacitive measurement sensor or with any other measurement sensor utilized in the μm range, wherein the relativization for the deformation path is respectively implemented after the lowering of the arbor.

The invention is also directed to a coupling mechanism for introducing a flexural coupler into a coupling position which comprises a receptacle part or base for at least one light waveguide and comprises a movable arbor that presses the light waveguide against the receptacle part. The improvement is that the arresting mechanism from the movable arbor is provided which will end the motion of the arbor in a selected working position and fixes the arbor in this working position.

The coupling mechanism of the invention can be particularly advantageously utilized in infeed or outfeed of light from at least one light waveguide when light is infed or outfed only in point fashion in a relatively small core region of the light waveguide. This is especially significant during infeed of light into light waveguide cores, since a designational, time-invariant focussing onto the core is required for coupling an adequately high light power into the waveguide.

Other advantages and features of the invention will be readily apparent from the following description of the preferred embodiments, the drawings and claims.

BRIEF DESCRIPTION OF THE DRAWINGS

FIG. 2 is a partial cross sectional view taken along the lines II—II of FIG. 1 showing the waveguide both before and after the deformation; and FIG. 3 is a cross sectional view taken along the lines II—II of the coupling mechanism according to FIG. 1 showing the introduction of a light waveguide ribbon.

DESCRIPTION OF THE PREFERRED EMBODIMENTS

Figure 1:
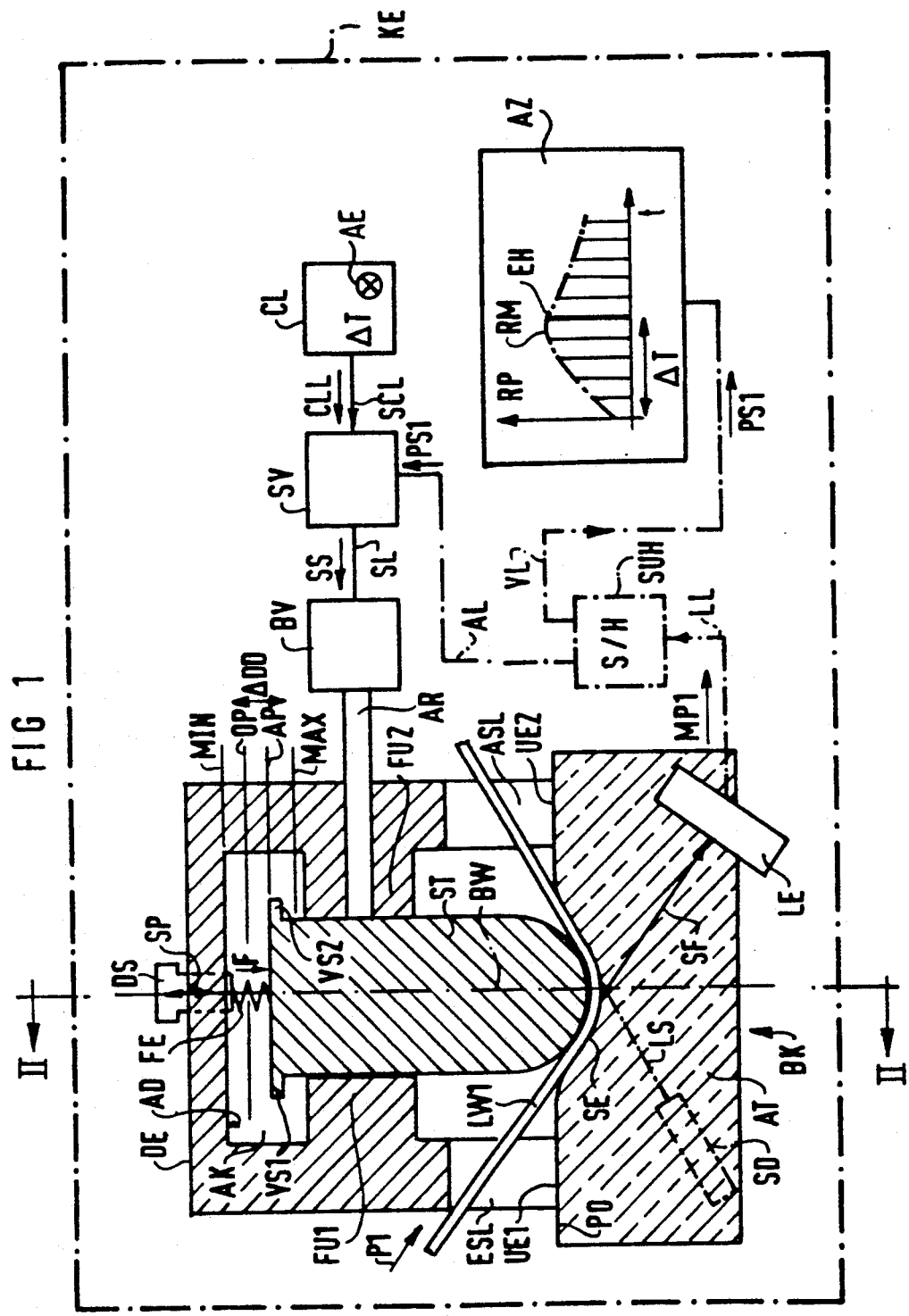
FIG. 1 is a schematic cross sectional view of a coupling mechanism for implementing the method of the present invention.

The principles of the present invention are particularly useful when incorporated in a coupling mechanism KE, which is illustrated to include a plurality of elements. The coupling mechanism KE includes a flexural coupler indicated at BK, which acts on a light waveguide LW1. This flexural coupler BK includes a receptacle part or base part AT for a light waveguide LW1 and the part AT is a fixed lower part and coacts with a movable upper part in the form of a cover DE. In order to be able to insert a light waveguide LW1 planarly and longitudinally into the receptacle part AT, the cover DE can be expediently hinged toward the back in a plane perpendicular to the plane of the section of FIG. 1 (see FIG. 3). The upper side of the receptacle part or base part AT in FIG. 1 has, in the middle portion thereof, a depression or trough SE with a circular arcuate surface. The remaining part of the upper surface of the receptacle part AT, by contrast, is a planar surface PO. The receptacle part or base part AT, on at least the trough or sink SE, is expediently transparently fashioned for infeed and outfeed of light and, for example, is constructed of a transparent material, such as plexiglass, glass, etc.

In the opened condition of the flexural coupler BK, the light waveguide LW1 is placed onto the planar surface PO of the base part AT in a straight line, in other words uncurved. The cover De is then brought onto the receptacle part AT so that the two component parts enclose the light waveguide LW1 therebetween. When the cover DE is closed down, an arbor ST attached to the cover DE will be moved in the direction toward the base part AT. The arbor ST can be advantageously fashioned as a die or as a cylindrical pin. Its end facing toward the receptacle part AT expediently comprises a geometrical shape matched in accordance with the arcuate path or curvature of the trough or sink SE. In order to be able to press the light waveguide LW1 "flush" against the curved surface of the trough SE of the receptacle part AT, a width that at least corresponds to the width of the light waveguide LW1 is expediently provided for the arbor ST. The arbor ST is expediently connected by a spring element FE to an underside or, respectively, inside cover part AD of the cover DE in a suspension chamber AK of the cover DE. The arbor ST can be expediently moved between a minimal position MIN and a maximum position MAX. The positions MIN and MAX are indicated in solid lines in FIG. 1. In the maximum position MAX, further movement of the arbor ST in the direction toward the light waveguide LW1 is ultimately suppressed by left-hand and right-hand projections VS1 and VS2 provided on the end of the arbor and facing toward the cover DE. These projections will strike against left-hand and right-hand guides FU1 and FU2 of the cover DE in the suspension chamber AK when the arbor assumes the maximum position MAX. The maximum position, thus, represents the maximum extended position for the arbor ST. During the closing event, the arbor ST is mounted with play, for example movable toward all sides. What is thereby advantageously avoided is that the light waveguide LW1 is charged with a shearing force given a potential radial hinge motion for the cover DE.

As soon as the flexural coupler BK is completely closed, for example the cover DE has its lower end UE1 and UE2 pressing planarly on the receptacle part AT and the arbor ST resides perpendicularly on the light waveguide LW1. The arbor ST is pressed out of its initial position OP between the position MIN and the position MAX in the direction onto the light waveguide with a force F which is dependent on the spring element FE. The pressing power F of the spring element FE can be advantageously set or adjusted in a defined fashion with the assistance of a clamp or threaded mechanism DS, which can be a turning screw and is accessibly attached to the outside of the cover AD. The adjustment of the mechanism DS is indicated with the assistance of a double arrow SP. Under the influence of the pressing power F of the spring element FE, the arbor ST now slides down between the two guides FU1 and FU2 of the cover DE. It thereby will press the light waveguide LW1 into the circular arc-shaped depression SE and thereby effect the curvature of the light waveguide LW1.

During this downward motion of the arbor ST, the light waveguide LW1 will experience a pressing power between 2 and 50 Newtons.

In order to prevent a buckling and damage to the light waveguide LW1 during this bending process as a result thereof, a left-hand admission slot ESL and a right-hand discharge slot ASL for the light waveguide LW1 are provided in the region of the seating parts UE1 and UE2 of the cover DE on the receptacle part AT. These recesses or slots ESL and ASL in the cover DE see to it that an adequate freedom of movement during the curvature process can be advantageously obtained for the light waveguide LW1.

The arbor ST slides between the two guides FU1 and FU2 from its initial position OP onto the receptacle part AT with the force F. It, thus, presses the light waveguide LW1 into a defined coupling position on the floor of the circular arc-shaped sink or trough SE adequately firmly and with sufficiently high pressure in order to assure a chronological optimum and variable operating condition for the infeed and outfeed of light. Air inclusions between the receptacle part AT and the coating of the light waveguide LW1 are, thus, advantageously prevented. In order to avoid air inclusions, an immersion agent such as, for example, glycerin can be additionally introduced into the transparent sink SE.

As soon as the arbor ST acts on the light waveguide LW1, the coating of the light waveguide LW1 begins to deform, i.e., to chronologically vary or, respectively, to flow. For this reason, the arbor ST is stopped in a working position AP at a specific point in time following the beginning of its downward motion. This working position AP is indicated in FIG. 1 with a solid line. As a result thereof, the deformation or, respectively, the flow of the coating of the light waveguide LW1 can be at least limited or even completely prevented. The discontinuation of the arbor motion is achieved in that the arbor ST is arrested or, respectively, clamped in the working position AP with the assistance of an interlocking mechanism AR between the two guide parts FU1 and FU2 transversely relative to its motion axis or active axis BW, indicated in dot-dash lines. The stopping or arresting of the arbor ST can therefore be expediently implemented with a clamp pin or clamp bolt that engages the arbor ST transversely relative to its motion axis BW and fixes the arbor ST between the guide parts FU1 and FU2. The arbor ST is, thus, mechanically fixed in this working position AP at a specific point in time following the activation of the flexural coupler BK, for example after the lowering of the arbor ST.

The arresting mechanism AR in FIG. 1 can be advantageously operated with the assistance of an actuation means BV. The actuation means BV can thereby be expediently activated with the assistance of a control means or mechanism SV. To this end, a control signal SS is communicated from the control means or mechanism SV by a control line SL to the actuation means BV which will then trigger the arresting mechanism. However, it can also be expedient that the arresting mechanism AR is directly actuated manually by an operator.

In the chronological duration $\Delta T$ after activation of the flexural coupler BK following the lowering of the arbor ST, the arbor ST moves from its initial position OP to the working position AP. Thus, the arbor ST traverses a distance $\Delta DD$ which can be advantageously obtained from a specific control criterion.

By way of example, the following control criteria come into consideration for the discontinuation of the arbor motion:

Given expiration of a chronological duration $\Delta T$ following the activation of the flexural coupler BK, for example, particularly after the beginning of the arbor motion into the sink SE, the arresting mechanism AR can be manually or automatically actuated with the assistance of a timer CL. In case of an automatic drive of the arresting mechanism AR, a control signal CLL is transmitted by the timer CL to the control mechanism SV on a control line SCL. The control mechanism SV then triggers the control signal SS for the actuation means BV via the control line SL. In the case of a manual operation of the arresting means AR, the time $\Delta T$ for actuating the arresting mechanism AR is indicated to an operator by a display signal. The optical display unit AE at the timer CL is shown in FIG. 1. For example, an acoustical reproduction of the display signal is also possible. The path limitation of the arbor ST can expediently occur after a chronological duration $\Delta T$ between 1 second and 60 seconds.

A second specific control criterion for discontinuing the arbor motion can also be advantageously obtained from the chronological change of a coupling factor or, respectively, coupling efficiency that characterizes the light quantity infed or outfed in the light waveguide LW1. To this end, the measuring of the relative infed or outfed light level can be immediately begun after the beginning of the arbor motion. Given coupling of the receiver LE to the light waveguide LW1, the measured signal P1 is guided in the light waveguide in FIG. 1. The specific light quantity can be coupled out from this measured signal P1 in the coupling region, for example the curvature region of the light waveguide LW1, with a respectively specific coupling factor and is picked up by a receiver LE in the transparent receptacle or base part AT. The outfed light quantity is indicated by an arrow SF. The outfed light SF is, thus, guided through the transparent receptacle part AT onto at least one light sensitive element, preferably onto at least one photodiode of a receiver LE and is converted into electrical measured signals MP1 by this receiver. For calculating the specific control criterion, the chronological curve of the outfed light level MP1 is expediently acquired by sampling individual measuring points in a line LL that is shown in dot-dash fashion and comes from the receiver LE in a short time interval and extends to a sample and hold circuit SUH shown in dot-dash lines. The sample and hold circuit forwards the measured signal PS1 as a digitized signal to the control means SV by a test line AL that is likewise indicated in dot-dash lines. When, for example, it is then found that the test level of these measured signals MP1 registered immediately after the closing of the arbor ST already sinks again or already beings to sink, then the motion of the arbor is discontinued at this point in time. There is a high probability that a further maximum in the curve of the relative reception level will then no longer occur.

A relative outfed light level RP over the observation time t after the beginning of the arbor motion is registered by way of example in a display means AZ in FIG. 1. This display means AZ can be expediently directly connected to the sample and hold circuit SUH by a data line indicated with dot-dash lines VL. By this data line, the digitized measured signals PS1 are communicated to the display means AZ, which brings it into a visual form. In the snapshot of FIG. 1, the discrete measured signal for the light level RP exhibits an envelope EH entered with a dot-dash line that rises immediately after the initial movement of the arbor ST due to the progressively increasing curvature or, respectively, deformation of the light waveguide LW1 and comprises a relative maximum RM and subsequently, in turn, decrease due to the beginning deformation of the coating of the light waveguide. After the maximum RM is upwardly exceeded, the motion of the arbor ST is stopped at time $t=\Delta T$ in order to largely limit a farther-reaching decrease in the coupling efficiency and, thus, in the received light level RP.

The course or trace of the slope of the envelope EH immediately after the movement of the arbor ST can, for example, be advantageously alternatively utilized as a further abort criterion. The maximum value RM, which is equal to a horizontal tangent, then defines the abort time ΔT.

After the discontinuation of the arbor motion, the actual measurement event with the receiver LE can begin. A chronological stability of the consistency of the coupling factor or, respectively, the coupling efficiency is then largely obtained for the entire measurement time from this point forward in the working position AP of the flexural coupler BK, so that measurements with high precision are possible.

This is significant, particularly given a topically-resolved, segment-by-segment outfeed of light along the curvature arc of the light waveguide LW1. Multiquadrant-diodes, diode arrays or CCT elements can be advantageously provided for segmented light pickup. Given these, a relatively small, local outfeed segment of light waveguide LW1 is respectively unambiguously allocated to a relatively small, light-sensitive element so that a high chronological consistency of the coupling condition is desirable.

Analogous considerations are also particularly valid for the coupling of a transmitter to the light waveguide LW1. A transmitter SD, for example an infeed light waveguide or an LED element, entered in dot-dash lines in the left-hand part of FIG. 1 is attached to the transparent part AT. The transmitter SD is aligned so that its transmission signal LS is coupled into the core of the light waveguide LW1 nearly tangentially in the curvature minimum of the light waveguide LW1. The main emission direction of the transmission signal LS is identified with a dot-dash line in FIG. 1. It is expedient for the infeed of an adequately great light power to focus the transmission signal LS to form an optimally small luminescent spot and to feed it into the relatively small core of the light waveguide LW1 as a point. The core is, thus, advantageously unambiguously allocated to the luminescent spot of the transmission signal LS and is precisely aligned thereto. Since the motion of the arbor ST is also aborted in the transmission case (as set forth in detail in the transmission case), an approximately chronologically stable infeed condition can be obtained. Beginning with this point in time defined by the arrest or stopping of the arbor ST, further continued deformation of the coating of the light waveguide LW1 is largely prevented. An approximately constant coupling factor for the following, actual measurement process can be advantageously obtained in this way during the infeed of light.

For identifying the optimum transmission coupling factor, a reception means that is constructed analogous to the coupling means KE is required in the present case to be positioned to the right of the infeed location of the transmission signal LS. The definition of the optimum transmitter coupling is possible there on the basis of the various selection criteria shown at the right-hand side of FIG. 1. The coupling criterion derived therefrom serves the purpose of stopping or arresting the arbor allocated to the transmitter SD in its working position on said arbor.

A third, specific control criterion can be advantageously obtained from the deformation path ΔD of the light waveguide LW1 by which the light waveguide is compressed during the influence of the pressing power F (see FIG. 2). The light waveguide LW1 is advantageously pressed into a sink SE, optimally without any air inclusions, and is firmly pressed thereat by the arbor ST. Under the influence of the pressing power F, a part of the coating material BE will migrate upwardly and downwardly into the free regions FB, which are the gap regions FB, between the arbor ST and the receptacle part AT and is pressed into these gap regions FB. A non-uniform, approximately oval distribution of the coating material BE will, thus, occur under the influence of the pressing power or force F. In order to illustrate this deformation of the light waveguide LW1, the original, undeformed condition of the light waveguide LW1 is illustrated in dot-dash lines. The coating BE, thus, migrates by the deformation path ΔD between an approximately circular, undeformed original profile UP to the compressed or, respectively, pinched profile QP.

The greatest allowable deformation path ΔD after which a discontinuation of the arbor motion occurs expediently lies between 5 μm and 75 μm. The extent of the deformation can, for example, be measured with the assistance of an inductive measuring sensor or a capacitive measuring sensor or with any other measuring sensor employed in the μm range. Such a measuring means DE for a relative measurement of the deformation path ΔD from the original profile UP to the pinched profile QP is schematically illustrated in FIG. 2.

Viewed overall, a test signal can now be coupled into or out of the light waveguide LW1 under largely constant, chronologically invariable coupling conditions after the wedging of the arbor ST transversely relative to its guide parts FU1 and FU2 with the arresting mechanism AR at an arbitrarily prescribable working position AP. One can, thus, generally forego a correction of the test signals for eliminating chronologically variable influencing quantities.

FIG. 3 schematically shows the flexural coupler of the invention according to FIG. 1, wherein a ribbon conductor BL having, for example, four light waveguides LW1 through LW4 that are embedded in an approximately rectangular, outer envelope AH is now placed onto the receptacle or base part AT of the flexural coupler BK on a straight line, i.e., uncurved, while the coupler BK is in a hinge-open condition. With the assistance of two guide jaws FB1 and FB2 that extend parallel to the longitudinal axis of the ribbon conductor BL, the ribbon conductor BL can be advantageously laterally fixed in position with respect to its longitudinal axis. These guide jaws FB1 and FB2 can be expediently attached to the receptacle or base part AT preceding and following the sink SE so that the arbor ST can be lowered into the sink SE umimpeded in any case for ribbon conductors having various widths. In the plane of the section of FIG. 1, the jaws FG1 and FB2 are additionally indicated in broken lines. Expediently, the guide jaws FB1 and FB2 are arranged movably transverse relative to the longitudinal axis of the ribbon conductor BL so that, as respectively indicated with the double arrows V1 and V2, a variable guide width for different ribbon conductor widths or a varying number of light waveguides can be set.

The cover DE, that is expediently movably arranged relative to the receptacle part AT via a hinge SN, is then hinged shut onto the receptacle part AT having the ribbon conductor BL. The hinge SN is expediently arranged at a lateral edge of the receptacle part AT. The arbor ST that is rectangular in cross section, as illustrated in FIG. 3, is suspended in an approximately rectangular suspension chamber AK in the cover DS via a spring element FE at a base AD of the chamber AK. As a result of the arcuate hinge motion, the part of the arbor ST closer to the pivot point of the cover DE comes into contact with the ribbon conductor BL proceeding uncurved earlier than the part thereof that lies radially farther toward the outside. This position of the arbor ST is illustrated with solid lines in FIG. 3. The arbor ST first presses against the left-hand side of the ribbon conductor BL in the region of the light waveguide LW1. The right-hand outside having the light waveguide LW4, by contrast, remains untouched at the start. In this way, the ribbon conductor BL is first brought down into the sink in the region of the first light waveguide LW1 under the seating force of the arbor ST. The right-hand outside having the light waveguide LW4 ultimately follows into the sink SE. The ribbon conductor is illustrated in dot-dash lines when it is in the curved position in the sink SE in FIG. 3 and is referenced BL*. In order to optimally prevent a tilting of the ribbon conductor BL* in its coupling position at the floor of the sink SE, the arbor ST is advantageously loosely suspended with play toward all sides in the suspension chamber AK. What can thereby be particularly largely avoided is having a shearing force component due to the arcuate hinge motion acting on the ribbon conductor BL* and, for instance, stressing the ribbon conductor at one side. It is advantageously possible in this way to compensate tolerances in the envelope material or varying ribbon conductor thicknesses. In FIG. 3, the arbor presses uniformly against the upper surface or side of the ribbon conductor BL* in the sink SE. It is also noted that as the arbor reaches the final position, its orientation shifts to that of ST* shown in dot-dash lines. When the cover DE thus presses planarly against the receptacle part AT, the arbor in position ST* has its bending edge BA residing perpendicular relative to the longitudinal axis of the ribbon conductor BL*. The arbor ST* presses planarly against the upper side of the ribbon conductor BL* with its dead weight without stressing the conductor in a one-sided fashion. In order to bring the flexural coupler BK into the working position AP, the arbor ST* finally is moved toward the ribbon conductor BL* uniformly between the guide parts FU1 and FU2, which are not shown in FIG. 3, via the clamping mechanism DS, which may be a turn screw being moved perpendicularly relative to the ribbon conductor BL* with the pressing power F. The pre-stressing effect of the clamp mechanism DS is thereby indicated by the arrow SP. As a result thereof, the ribbon conductor BL* is pressed into the circular arc-like sink SE in a defined way and is pressed therein against the floor of the sink SE for infeed or outfeed of light in its coupling position.

Finally, the influence of the arbor ST on the ribbon conductor BL* in the sink SE can be discontinued in a selected working position AP with the assistance of a specified control criterion in accordance with the above discussion.

For deriving a specific control function given a light waveguide ribbon, in particular, the maximum of the light level proceeding lowest, i.e., the maximum in the intensity curve for the light waveguide having the poorest coupling factor in the ribbon, can be expediently utilized for aborting or stopping the arbor motion. The drop of the lowest occurring light level below all light levels of the light waveguides in the ribbon can, likewise, serve as an abort or stop criterion. What is advantageously assumed is that at least no further deterioration of the coupling conditions, but a chronological stabilization of the coupling conditions at least occurs for the light waveguide having the poorest coupling efficiency and, thus, also for all other light waveguides in the ribbon.

The coupling mechanism KE can expediently be a component part of a light waveguide attenuation measuring device or of a light waveguide splicing device in a single-fiber or multi-fiber technology (given light waveguide ribbons). It is particularly suitable for measuring systems according to the LID principle ("light injection and detection"), since the LID principle makes high demands of the consistency of the power level in the light waveguides during the entire measuring time for exact measured results.

Although various minor modifications may be suggested by those versed in the art, it should be understood that I wish to embody within the scope of the patent granted hereon all such modifications as reasonably and properly come within the scope of my contribution to the art.

I claim:

1. In a method for introducing a flexural coupler into a coupling position which includes moving a movable arbor into at least one light waveguide having a coating to move and press the waveguide against a receptacle part to form a curved path along which light can be coupled in and out, and selectively coupling a beam of light from a transmitter into the waveguide at the curved path and decoupling light at the curved path to a receiver, the improvements comprising the moving of the movable arbor to press the waveguide against the receptacle pinching the coating to a compressed profile from an original profile by a progressive compressing, determining a specific control criterion for a selectable working position, using the control criterion to limit continuing deformation of the coating by engaging the arbor to stop the motion of the arbor in the selected working position and retaining the arbor in this working position.

2. In a method according to claim 1, wherein the light waveguide ribbon is utilized and said arbor is pressed thereagainst.

3. In a method according to claim 1, wherein the specific control criterion is a selectable chronological duration.

4. In a method according to claim 3, wherein the chronological duration is selected to be between 1 second and 60 seconds.

5. In a method according to claim 1, which includes measuring the infed/outfed light levels in the light waveguide, and said specific control criterion is derived from a chronological change in this measured light level.

6. In a method according to claim 1, which includes determining the deformation path of the light waveguide and said specific control criterion is determined by this deformation.

7. In a method according to claim 1, which includes laterally guiding the arbor during its motion.

8. In a method according to claim 1, which includes laterally guiding the arbor with axial and radial play until it is restrained in the working position.

9. In a method according to claim 1, wherein the step of moving the arbor into the light waveguide presses the arbor with a force between 2 and 50 Newtons.

10. In a method according to claim 1, wherein the step of engaging the arbor includes engaging the arbor transversely relative to its motion axis.

11. In a method according to claim 1, wherein the method is applied at least on a single light waveguide.

12. In a coupling apparatus for introducing a flexural coupler into a coupling position, said apparatus including a base part for at least one light waveguide having a coating, a movable arbor for pressing a light waveguide against the base part to deform the coating and to form a curved path in the waveguide, means for moving the arbor against the base part and either means for receiving light uncoupled from the curved path of the waveguide or means for directing light at the curved path for coupling into the waveguide, the improvements comprising means for determining a specific control criterion for a selected working position of the arbor, means for engaging the arbor to arrest the movable arbor in response to the specific control criterion and to limit continuing deformation of the coating, said means for engaging ending the motion of the arbor in said selected working position and retaining the arbor in said working position.

13. In a coupling apparatus according to claim 12, wherein the coupling apparatus is a component part of a light waveguide measurement apparatus, a splicing apparatus or an attenuation apparatus.

14. In a coupling apparatus according to claim 12, wherein the means for engaging is arranged transversely relative to the motion axis of the arbor and the means for engaging transversely engages the arbor.

15. In a coupling apparatus according to claim 12, wherein said means for moving the arbor is biasing means.

16. In a coupling apparatus according to claim 12, wherein the means for determining specific control criterion includes a timer means for providing a chronological duration as a specific control criterion.

17. In a coupling apparatus according to claim 12, wherein the means for determining includes a measuring system for determining the chronological change in the infed/outfed light level at a coupled light waveguide to provide the specific control criterion.

18. In a coupling apparatus according to claim 12, wherein the means for determining includes measurement means for measuring the deformation path of the light waveguide to provide the specific control criterion.

19. In a coupling apparatus according to claim 12, which includes actuating means being provided for triggering the means for engaging the arbor.

20. In a coupling apparatus according to claim 12, wherein the movable arbor has a structure of a die.

21. In a coupling apparatus according to claim 12, wherein the means for engaging is fashioned as a clamp pin.

22. In a coupling apparatus according to claim 12, which includes control means for providing a triggering signal for actuating the means for engaging.

23. In a coupling apparatus according to claim 12, which includes lateral guide parts for guiding the movable arbor.

24. In a coupling apparatus according to claim 12, which includes adjustable guide means for a light waveguide being provided on the base for positioning the light waveguide.

* * * * *